No. 753,414. PATENTED MAR. 1, 1904.
G. LUGER.
RECOIL LOADING SMALL ARMS.
APPLICATION FILED MAR. 17, 1900.
NO MODEL. 10 SHEETS—SHEET 2.
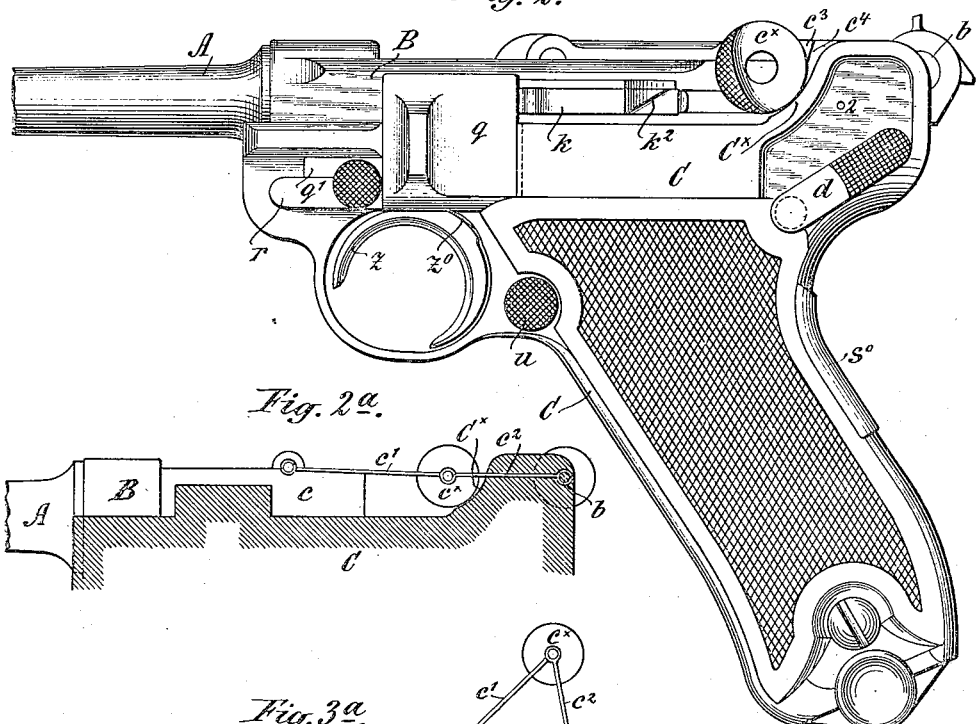
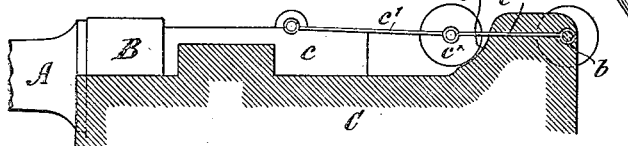
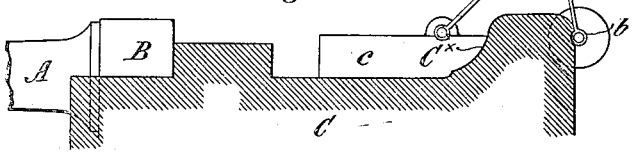
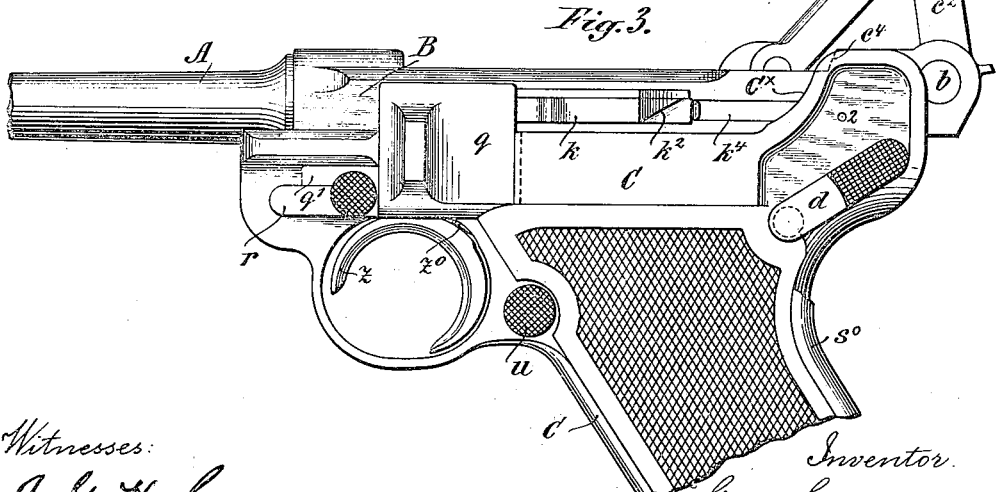
Witnesses:
A. G. Heyman
E. H. Bates
Inventor.
Georg Luger
by Herbert W. Jenner
Attorney.

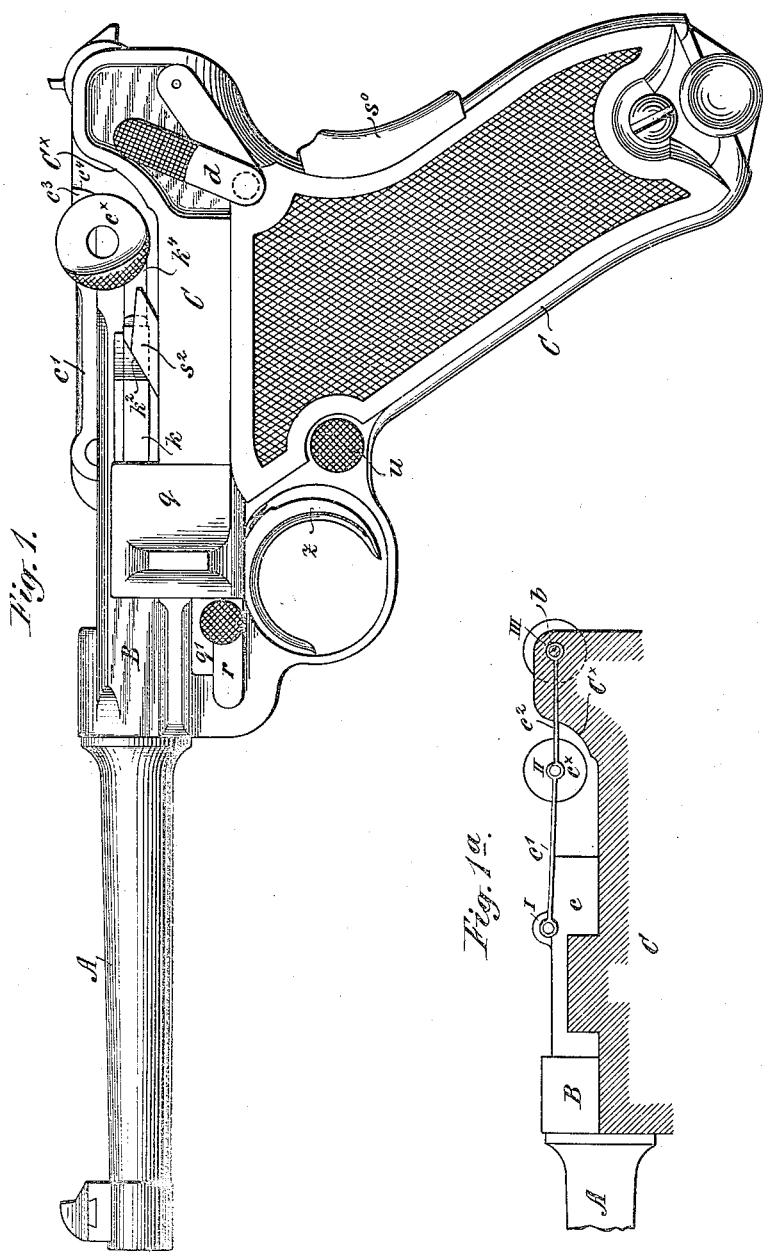

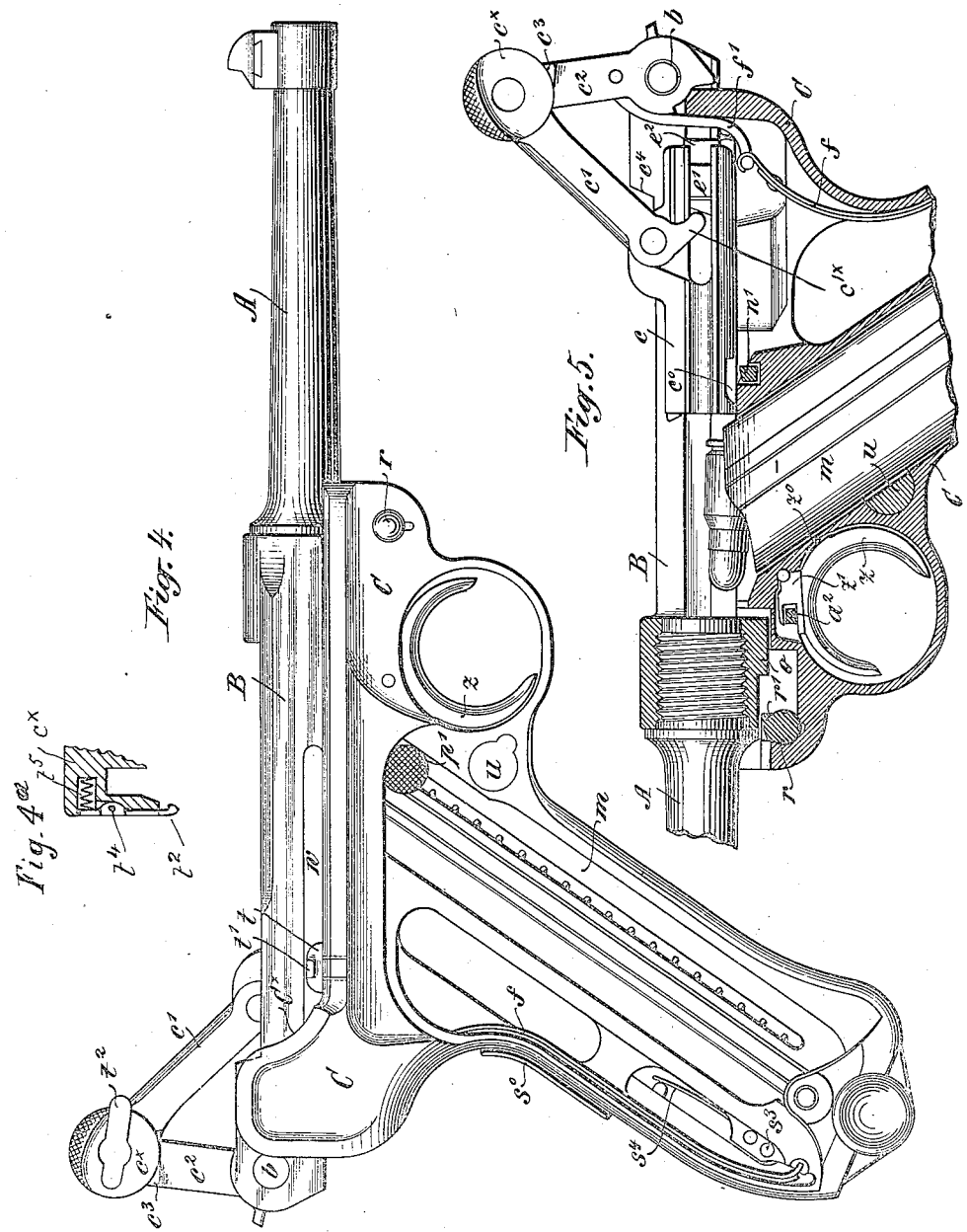

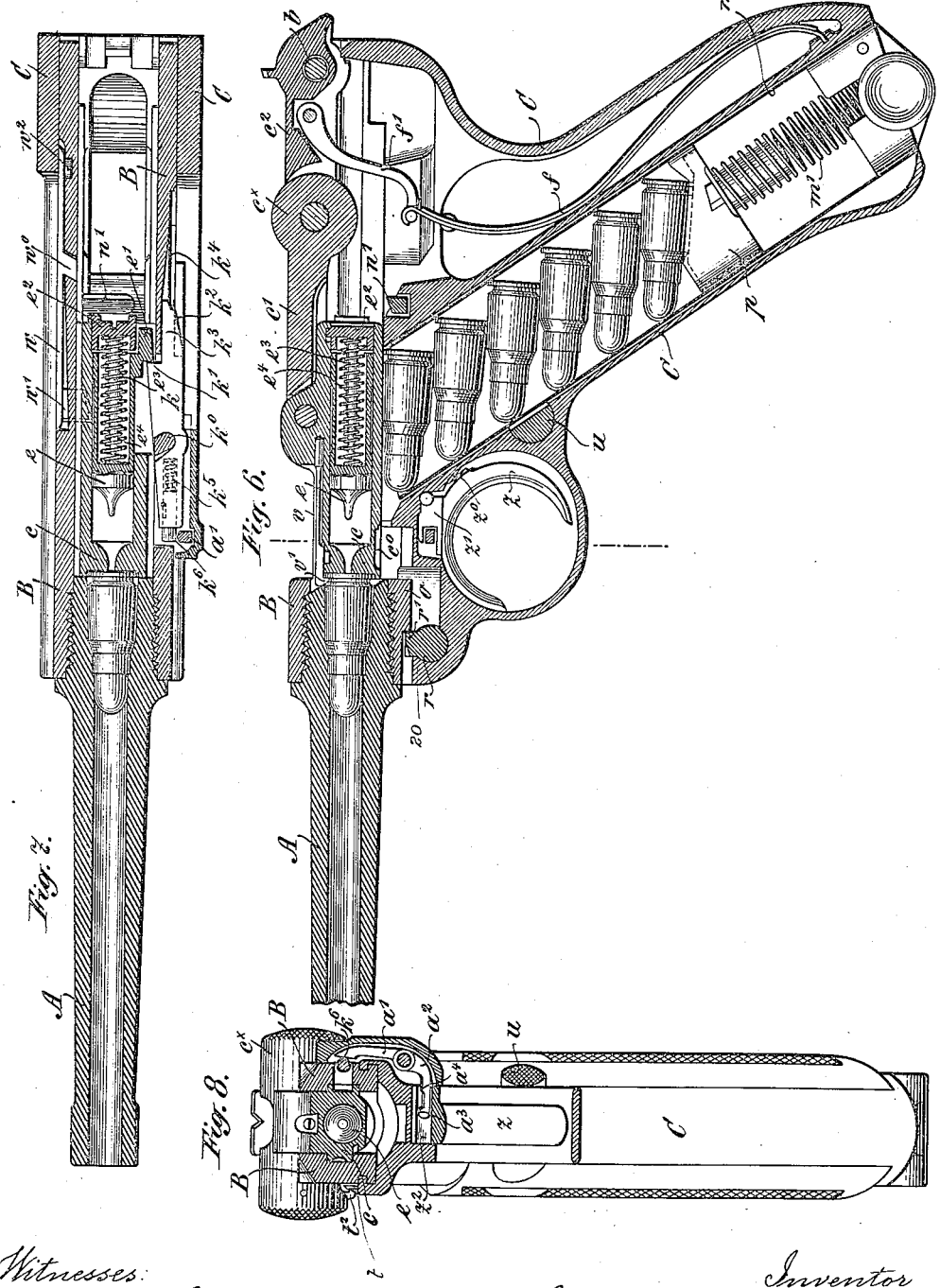

No. 753,414. PATENTED MAR. 1, 1904.
G. LUGER.
RECOIL LOADING SMALL ARMS.
APPLICATION FILED MAR. 17, 1900.
NO MODEL. 10 SHEETS—SHEET 5.
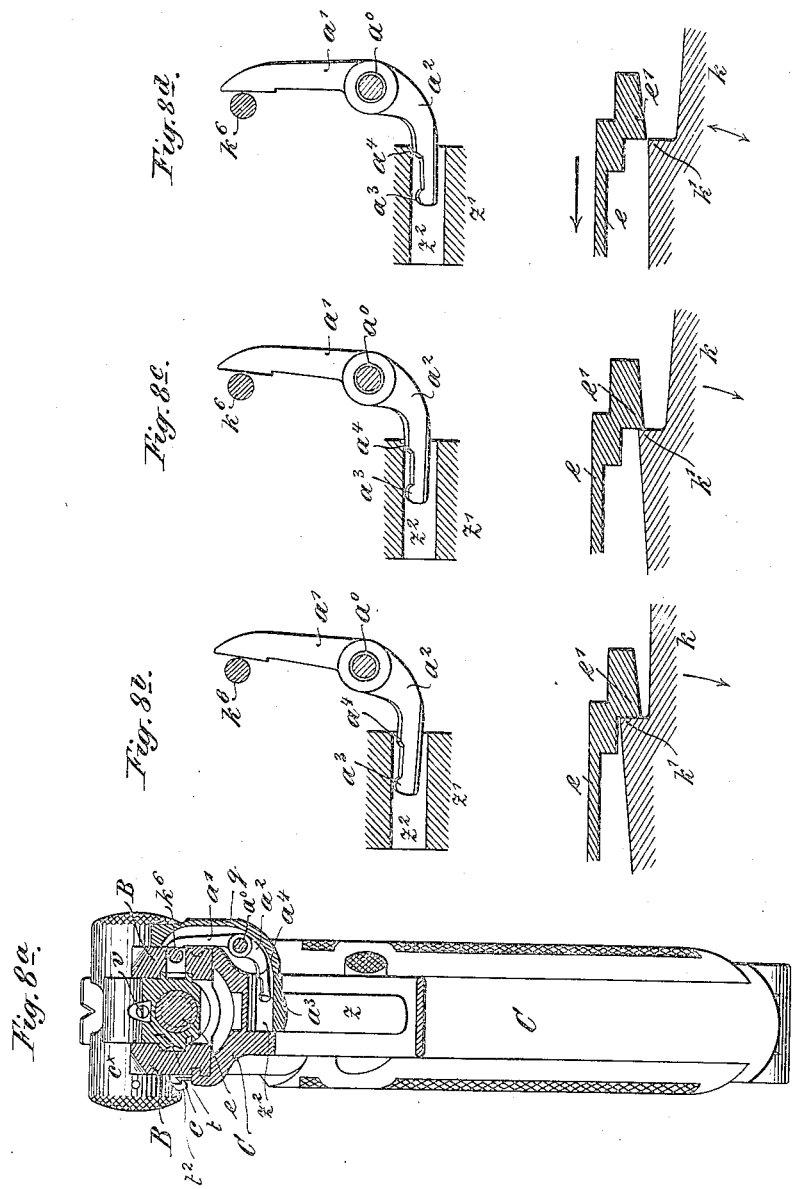
Witnesses:
Inventor
Georg Luger
by Herbert W. T. Jenner
Attorney

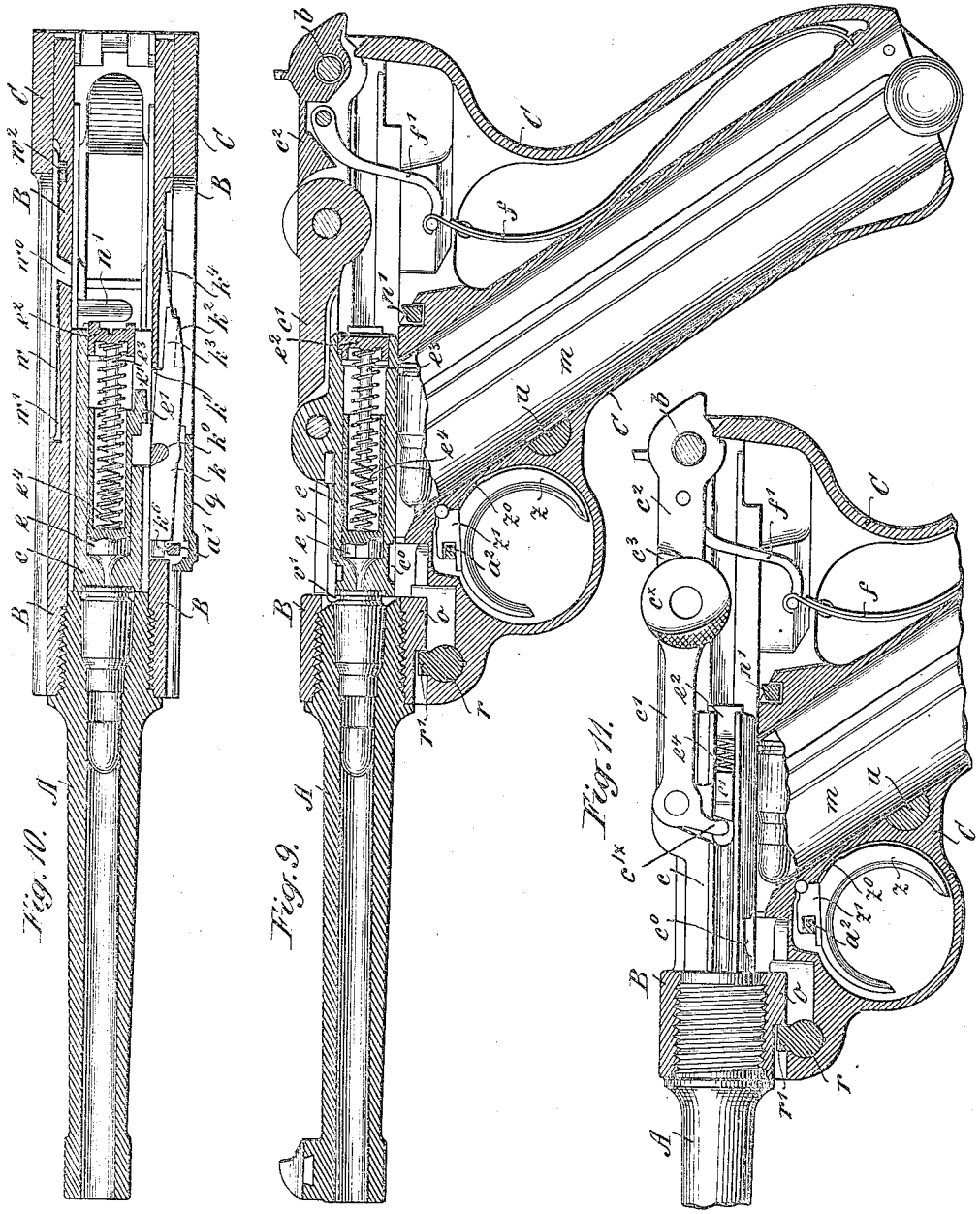

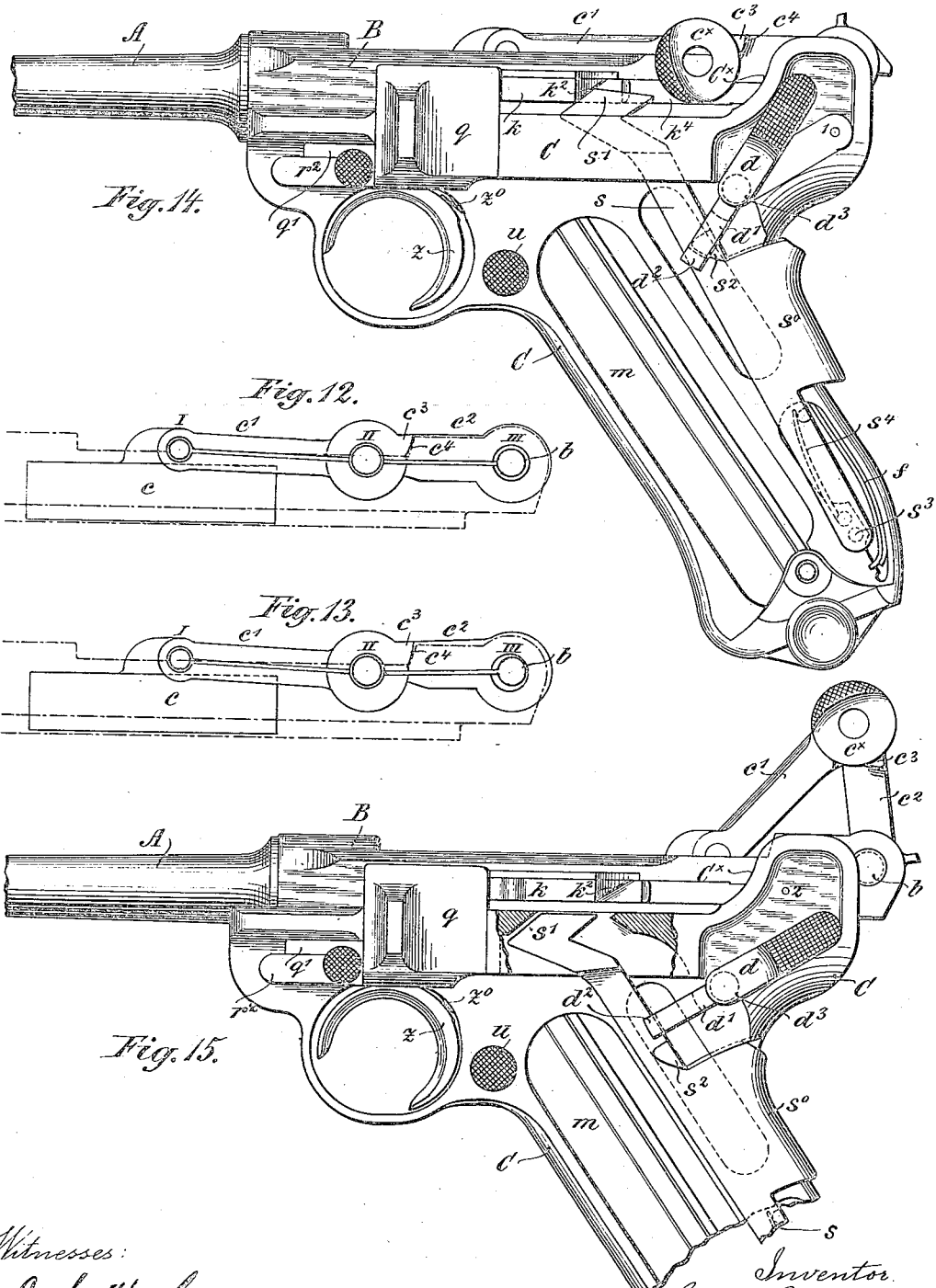

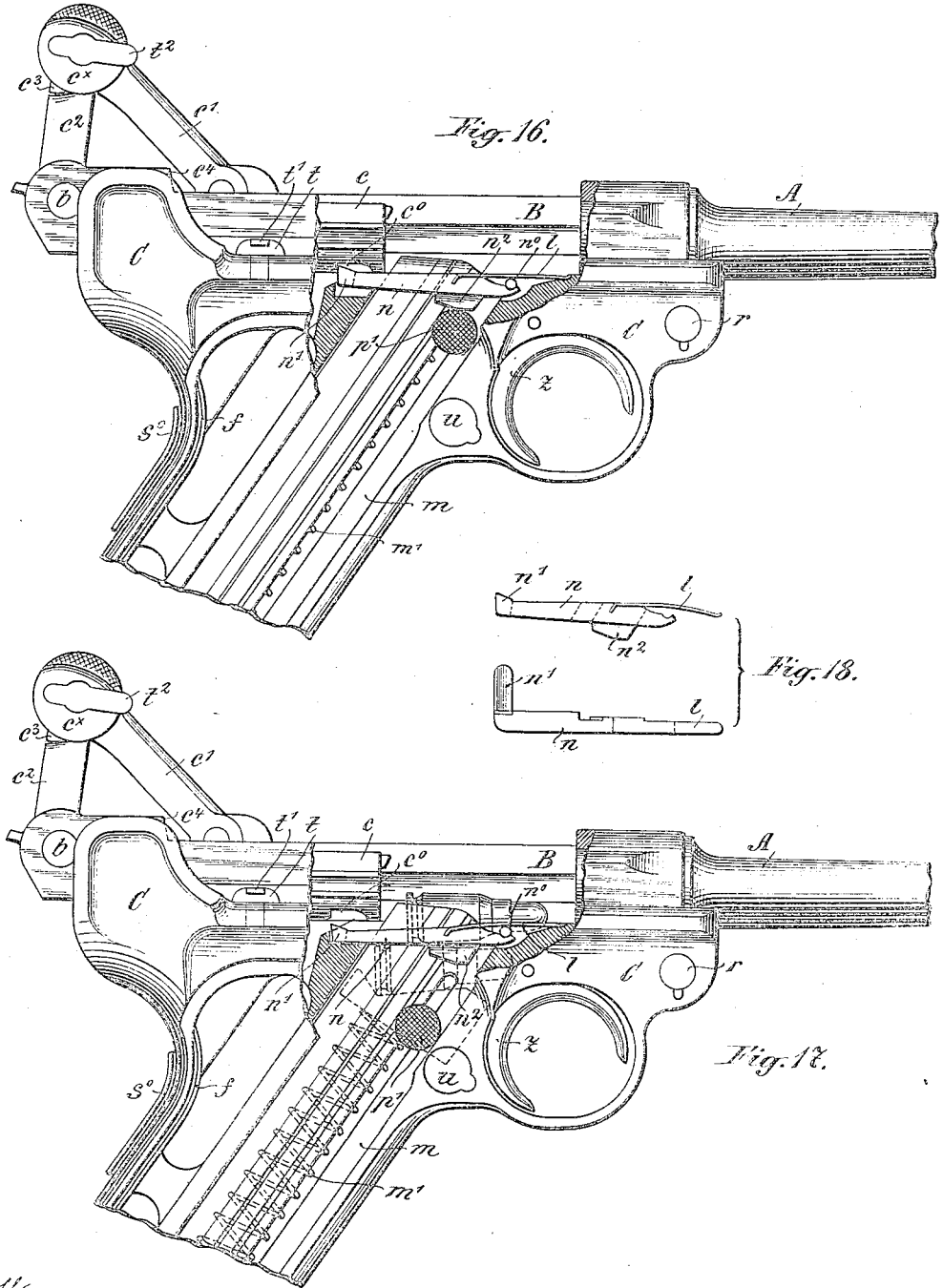

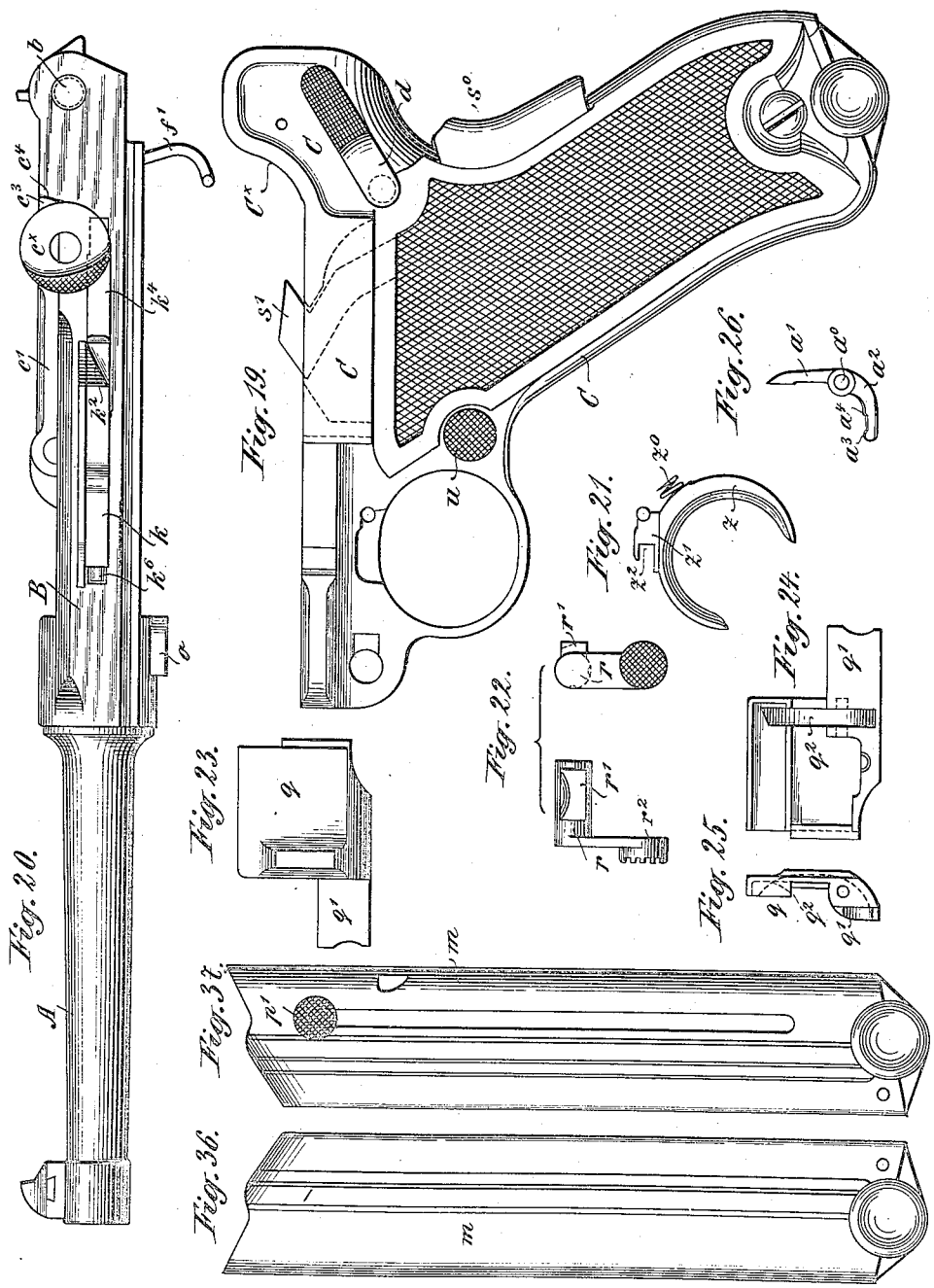

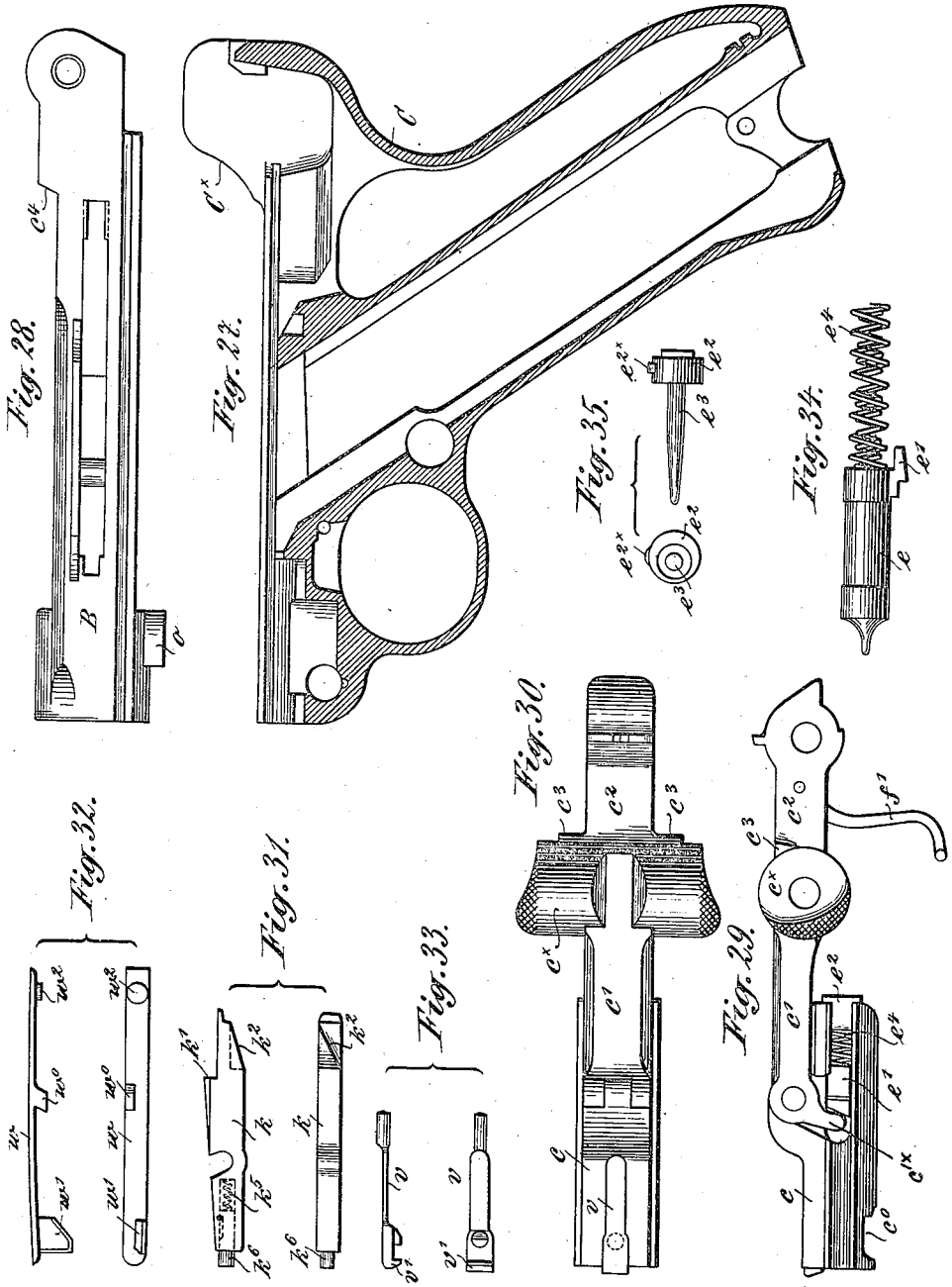

No. 753,414. Patented March 1, 1904.

UNITED STATES PATENT OFFICE.

GEORG LUGER, OF CHARLOTTENBURG, GERMANY.

RECOIL-LOADING SMALL-ARM.

SPECIFICATION forming part of Letters Patent No. 753,414, dated March 1, 1904.

Application filed March 17, 1900. Serial No. 9,083. (No model.)

*To all whom it may concern:*

Be it known that I, GEORG LUGER, engineer, a subject of the Emperor of Austria-Hungary, residing at Weimarerstrasse 34, Charlottenburg, Kingdom of Prussia, German Empire, have invented certain new and useful Improvements in or Connected with Recoil-Loading Small-Arms; and I do hereby declare the following to be a full, clear, and exact description of the invention, such as will enable others skilled in the art to which it appertains to make and use the same.

This invention relates to improvements in recoil-firearms provided with movable barrels and toggle-actuated or knee-jointed breech-blocks, its object being, while simplifying the construction of breech-loading recoil-firearms of this class, to perfect their operation in such a manner as to enable them fully to meet all reasonable requirements.

The invention has reference not only to arrangements calculated to improve the mode of operation of the most important parts of the weapon, and more especially of the breech mechanism, and to simplify their structural features, but also to devices by the aid of which, while the weapon is being carried from place to place, the parts are prevented from coming accidentally into operation when they are required to remain out of action and which in firing render it impossible for the breech to open prematurely under the pressure of the gases, so that the safety of the marksman is under all circumstances guaranteed, and yet the readiness for firing of the weapon is in no way impaired.

As regards first of all the breech mechanism there is provided a highly important new arrangement which enables the toggle or knee joint at the barrel end, which serves to effect a positive closing, to be extended or closed or cranked, folded, or opened, as the case may be, by manipulating it directly at the central hinge or pivot-point, whereas it is a well-known fact that formerly special lever mechanism was required to transmit motion thereto for this purpose. The knee-joint or toggle is in existing arrangements secured in the "closed" position and enabled to withstand the pressure of the gases by a construction owing to which when the links of such knee-joint are extended its central hinge comes to be situated a little below the end points of the joint. This slight depression, adopted on the "knee-press" principle, is intended to protect the joint while at rest and during the rearward traverse of the barrel from breaking open. Now in order to make this arrangement entirely secure the contrivance here adopted consists in providing the rearward joint of the toggle-lever with shoulders which are somewhat inclined in upward and rearward directions and which lie in close contact with conveniently-situated abutments and in conjunction with the pivot of the knee-joint take up on behalf of the rearward lever the gas-pressure transmitted rearward by the breech-block. The result is that the gas-pressure in all cases is first exerted upon the above-mentioned beveled shoulders or upon the abutments supporting them, so that only part of its weight is brought to bear upon the pivot of the rear lever of the joint, and which pivot is fitted loosely in its socket, whereas in the existing constructions this pivot had to sustain the full gas-pressure and was accordingly liable to injury or destruction by bending or breaking. Owing to the provision of the free space above alluded to for the pivot of the rear lever to work in—small as that space is—and, further, of the beveled shoulders, the links of the toggle-lever or knee-joint when extended have, as will be more fully explained later on, a tendency to move in such a manner that in firing—that is, under the influence of the pressure of the gases—before the bullet has left the barrel, and consequently before the barrel has receded, the premature folding or cranking of the jointed links—or, in other words, the premature opening of the breech—cannot take place.

With reference to the closing-spring, which serves to close the breech—or, in other words, to restore the knee-joint or toggle after it has been opened or cranked to its closed or extended position—the improvement which this invention provides is that a flat spring is used for the purpose, which is extended to its full length, or approximately so, within the neck of the butt, the operative or free upper end of such spring being connected to a swinging arm suspended from the rearward link or lever of the knee-joint or toggle, owing to the intermediate agency of which arm the said spring, though having but a comparatively narrow space to work in, is enabled to control the movements of the knee-joint or toggle within given and relatively wide limits.

In order to facilitate and simplify as far as practicable the operations of taking the firearm to pieces and afterward refitting the same, the device here adopted consists in connecting the portion of the weapon which comprises the receiver and the barrel with the butt or handle-piece, which receives that portion, by means of a sliding and revoluble bolt fitted in the butt so as to be laterally removable and constituting what it is proposed to describe as the "breech-holder," a projecting part or stop of which is adapted to rest directly or indirectly against an extension or projection on the lower side of the barrel. While the barrel is at rest—that is, in the forward position—the barrel-tube or its extension is, under the influence of the closing spring, which maintains the linked levers or toggle in the extended condition and the barrel in its forward position, firmly pressed against the bolt, or rather the stop of the bolt, so that consequently the said closing-spring itself serves to secure the connection of the barrel or barrel-tube and the receiver with the butt.

The invention further comprises a novel automatic arresting arrangement for keeping the breech open after the contents of the magazine have been exhausted. It consists of a special arresting-lever located within the firearm on one side of the magazine, close to the opening through which the cartridges pass into the breech, such lever being adapted when in consequence of the magazine being empty the cartridge-feeder is raised after the last cartridge has been fired to be moved into the operative position by a stop, stud, or the like, connected with the said cartridge-feeder in such a manner that one end of it rests against a shoulder of the breech-block, thereby preventing its moving into the closed position. Now even should the empty magazine be removed the arresting-lever being engaged with the breech-bolt still owing to the action of the breech-closing spring, compels the breech to remain open, so that for the purpose of inserting a freshly-filled magazine and loading the barrel the necessity of first reopening the breech is avoided. The button or stud with which the cartridge-feeder is provided to enable it to operate the arresting-lever will at the same time render signal service in depressing the feeder-spring while the magazine is being filled.

Certain improvements, to be more fully described hereinafter, have also been made in the trigger and in the means for securing the same.

In the accompanying drawings, in which a recoil-firearm in the form of a pistol constructed in accordance with the present invention is represented, by way of example, and in which like parts are indicated by similar letters of reference, Figure 1 is a left-hand side elevation of the pistol with all the operative parts secured against accidental movement. Fig. 1$^a$ is a corresponding diagram illustrating the position of the breech mechanism or knee-joint. Fig. 2 is a similar view to Fig. 1, but showing the pistol after firing in the first stage of the rearward motion of the barrel—that is, before the breech knee-joint or toggle has been retracted or opened. Fig. 2$^a$ is a corresponding diagram of parts. Fig. 3 is a similar view to Fig. 2, but showing the pistol with the breech open and the knee-joint or toggle retracted and the barrel in its rearmost position. Fig. 3$^a$ is a corresponding diagram of parts. Fig. 4 is a view taken from the right-hand side, representing the parts of the pistol in the same position as in Fig. 3, but with the wooden butt casing or shell removed. Fig. 4$^a$ is a detail side view of the spring-actuated catch member $t^2$. Fig. 5 is a side elevation, partly in section, corresponding to Fig. 3, including an elevation of the retracted knee-joint or toggle. Fig. 6 is a vertical longitudinal section representing the pistol immediately before firing. Fig. 7 is a corresponding horizontal section taken on the axial line of the barrel. Fig. 8 is a vertical transverse section taken on the line $x x$, Fig. 6, and viewed from the front. Figs. 8$^a$ to 8$^d$ illustrate the arrangement and operation of the trigger mechanism in its several positions, Figs. 8$^b$, 8$^c$, and 8$^d$ being diagrams showing the particular position occupied at the time by the trigger-lever and trigger-rod in each case. Fig. 9 is a similar view to Fig. 6, but representing the pistol immediately after firing and showing the magazine in elevation. Fig. 10 is a horizontal section corresponding with Fig. 9. Fig. 11 is a longitudinal section, but with the breech mechanism in elevation, showing the parts in the same positions as are represented in Fig. 9. Figs. 12 and 13 are diagrams showing how, before and during the firing operation, the shoulders of the rear link of the toggle-levers coöperate with their respective abutments and the rear pivot of the levers and also illustrate the disposition of the toggle or knee-joint and its constituent parts when subjected to the pressure of the gases, but prior to the backward stroke of the barrel. Fig. 14 is a similar view to Fig. 1, illustrating the manner in which the barrel and trigger are locked against movement by means of an arresting device, the corresponding half of the butt-shell being removed for the sake of greater clearness. Fig. 15 is a similar view representing the arresting device out of action, the barrel and trigger being consequently unsecured and free to move. Figs. 16 and 17 are sectional side views illustrating the arrangement and operation of the breech-bolt-intercepting device, whereby after the magazine has been emptied—that is, the last cartridge fired—the breech is held open. Fig. 18 comprises a side elevation and a top view or plan of the breech-bolt-intercepting lever. Fig. 19 is an elevation of the handle-piece or butt separately. Fig. 20 is a separate view of the barrel with the fork-shaped extension and the breech knee-joint or toggle. Fig. 21 is a separate elevation of the trigger tongue and spring. Fig. 22 is a front and side elevation of the barrel-holding bolt. Figs. 23, 25, and 24 are respectively a side elevation, viewed from left to right, a front elevation, and an opposite side view of the trigger cover-plate separately. Fig. 26 is a front elevation of the trigger-lever separately. Fig. 27 is a vertical longitudinal section of the butt separately. Fig. 28 is a side elevation of the fork-shaped barrel extension separately, the breech knee-joint or toggle and trigger-rod being omitted. Fig. 29 is a side elevation of the knee-joint or toggle and breech-bolt separately. Fig. 30 is a top view or plan thereof. Fig. 31 is a top view and side elevation of the sear separately. Fig. 32 is a top view and side elevation of the cartridge-ejector separately. Fig. 33 is a top view and side elevation of the cartridge-extractor separately. Fig. 34 is a separate view of the firing-pin, together with its actuating-spring. Fig. 35 is a front elevation and a side elevation of the end piece of the breech-bolt, and Figs. 36 and 37 are opposite side elevations of the magazine separately.

As is usual in recoil-firearms of the category of arms to which the pistol represented in the drawings belongs, said pistol comprises three parts—namely, the barrel A, with the fork-shaped extension B integral with or rigidly attached to it, the breech-block $c$, and the case C, whereby the barrel and fork-shaped extension are guided and which in pistols or the like is best formed, as shown, with its lower extension constituting the handle of the weapon. The case C will therefore hereinafter be referred to throughout as the "handle-piece."

As stated in the introductory part of this specification, this firearm is one of the class wherein the closing of the breech is effected by means of a knee-joint or toggle, and it engages one of the levers—namely, the front comprises a breech-block $c$, movable in the fork-shaped barrel extension B, with which one, $c'$, while the other or rear lever, $c^2$, is hinged to the said fork-shaped extension by means of the pivot $b$. Now in accordance with the present invention the knee-joint or toggle is cranked, folded, or opened while the barrel performs its rearward movement. To this end the lever-eye knuckle or boss with which the knee-joint or toggle is provided, and which in the example shown forms part of the rear lever $c^2$, though, if desired, it might be formed on the forward lever, is extended laterally in one or, preferably, in both directions beyond the arms of the fork-shaped barrel extension B, thus forming studs, projections, or shoulders, which in the drawings are marked $c^\times$. In the path of these studs or projections $c^\times$ in the present example suitably-curved guide-surfaces $C^\times$ are provided on both sides of the handle-piece, which when the barrel recedes are impinged upon by the above-mentioned studs or projections $c^\times$, which by reason of their shape are termed "knee-eyes" or "link-eyes," so that when a shot is fired they are by the effect of the recoil moved upward, and thus become the means of cranking or "opening" the linked levers. During the first stage of this operation the closing-spring $f$ is strained somewhat, so as to modify the violence of the impact of the studs or shoulders $c^\times$ upon the curved guide-surfaces $C^\times$, and thereby, as far as practicable, protect the parts involved from wear or destruction. This phase is illustrated in the drawings by Figs. 1 and 2 and the corresponding diagrams $1^a$ and $2^a$, Figs. 1 and $1^a$, showing the position of the breech-closing mechanism when the linked toggle-levers are extended, while Figs. 2 and $2^a$ illustrate the moment at which the studs or shoulders $c^\times$ impinge upon the guide-surfaces $C^\times$. The position of the parts while the jointed levers are cranked or folded, or, in other words, while the breech-closing mechanism is open, is illustrated in Figs. 3 and $3^a$. In the second phase of the process of recession of the barrel, during which the studs or shoulders $c^\times$ rise to their highest position by sliding along the guide-surfaces $C^\times$, the closing-spring is necessarily subjected to its highest strain, so that the next succeeding first stage of the advance or closing movement of the breech-block, during which the cartridge is made to pass from the magazine into the barrel, is accomplished by the aid of the maximum power which the spring is capable of displaying as it is relieved from pressure. As the linked arrangement is about to be cranked or opened the fullest possible benefit is derived from the relative position of the levers, inasmuch as it will be seen that the power of the recoil becomes operative at the joint connection of such linked arrangement, in the present example the front end of the rearward linked lever, so that the full length of the linked levers comes into play as the resultant motive force attains the maximum. The link connection is partly carried out in the manner already known. Thus when the linked parts are extended it happens that of the three points I, II, and III of the toggle-joint the axis of the central one, II—namely, the "knee" proper—occupies a position a little below a line drawn through the axes I and III of the ends of the jointed parts, as clearly shown in Figs. 1ª and 2ª. It is, however, essential that this depression of the central part of the joint should be very slight indeed if it be desired that while the cartridge is firmly fixed in its firing position the opening of the breech should be feasible without difficulty. Now to effect this result the arrangement is supplemented by the following improved device: The rearward linked lever $c^2$ is provided with inclined shoulders $c^3$, which when the linked levers are extended come into close contact with correspondingly-inclined offsets $c^4$ of the fork-shaped barrel extension B, so that while the breech is closed or the link mechanism extended these offsets or abutments $c^4$ are capable, in conjunction with the pivot $b$, of taking up the pressure of the gases evolved in firing, thereby affording said pivot partial relief from pressure. This object is attained in a perfect manner by inserting the said pivot or pin $b$ into its socket loosely, whereby the result is secured that under all circumstances the pressure of the gases will invariably exercise its effect first upon the shoulders $c^3$ and their abutments $c^4$ and will in consequence of the obliquity of the contact-surfaces raise the rear end of the linked lever $c^2$ and at the same time cause the said pivot to rest in contact with its bearings and so that the extended links will exhibit a tendency rather to become a little more depressed at the center, though this tendency is of course limited by the amount of play given to the pin or pivot $b$, but is at all events no more than sufficient to prevent a premature folding or cranking of the links in firing in a more effective manner than is feasible in existing constructions. The tendency of the linked parts just referred to, which is caused partly by the fact already mentioned that the axis of the knee proper in any event comes to be situated a little below the axes of the ends of the linked parts and partly by the loose condition of the pin or pivot $b$, is illustrated in Figs. 12 and 13, the former figure showing the normal or inoperative position thereof, in which the linked or breech-closing parts are not subject to any strain, while the latter figure indicates that position which the parts will occupy when the links are under the action of the pressure of the gases before the barrel has receded—that is, up to the moment when the studs or projections $c^x$ impinge upon the curved guide-surfaces $C^x$. The freedom or play allowed to the pivot $b$ is here shown on a somewhat exaggerated scale, so that the operation of the parts at this juncture may be fully understood. The pivot $b$, as will be seen, has here been raised, and so the shoulders $c^3$ have for a short distance been moved upward, without, however, having come out of contact with their supports $c^4$.

The closing-spring $f$, which controls the linked mechanism and restores it to the closed or extended position after the breech has been opened, is a plate-spring lying in the neck of the butt C, extended to its full length, or nearly so, parallel to the magazine and having, preferably, an S shape. Its lower end is laterally inserted into a notched or recessed projection of its guiding-wall, while its operative upper end is suitably connected with a swinging arm $f'$, also preferably of an S shape, which is pivotally connected with the rearward linked lever $c^2$. The lower end of the arm $f'$ carries laterally-projecting studs, over which the end of the spring is passed and with which it engages by means of a half-open hinge-eye suitably constructed in the shape of a claw or hook. This method of connection insures perfect mobility and enables the parts to be readily detached when it is desired to take the weapon to pieces.

The object of the combination of the spring $f$ with the arm $f'$, in view of the comparatively limited play afforded to the spring by its confined location, is to enable the movements of the linked mechanism within the given relatively wide limits to be controlled. The great advantage of this arrangement of the spring is, in fact, that while it occupies very little space it is yet capable of exerting very great power. The closing-spring also holds the barrel against the stop or bolt which connects it with the handle-piece and prevents it from sliding out of same. This connection is effected by means of a revoluble bolt $r$, removably fitted within such handle-piece and herein termed the "breech-holder," which is provided with a stud, projection, or stop $r'$. When the parts are connected, the position of the bolt $r$ (shown in Figs. 6 and 9) is such that its stud $r'$ is situated in front of a shoulder $o$, projecting from the lower side of the barrel. The said shoulder or projection $o$ thus serves to limit the forward movement of the barrel, and the barrel or the said projection or shoulder $o$ is normally held in contact with the stud $r'$ by the spring $f$, the closing-spring $f$ being under slight tension even while the firearm is operative, so as to obviate any accidental movement of the parts. In Figs. 14 and 15 a handle $r^2$ is shown projecting from the end of the bolt $r$ for the purpose of operating it. When the bolt is in the position shown in Fig. 6, the projection $r'$ rests against a stop 20 on the handle-piece, so that the barrel cannot be pushed forward until the projection $r'$ is turned downward out of the path of the shoulder $o$.

In order that the breech may remain open when the magazine is empty, an arresting-lever $n$, Figs. 16, 17, and 18, is arranged in the side wall of the handle-piece at what is termed the "break," next to the magazine-orifice, such lever being controlled by a spring $l$ and provided with an arresting finger or tappet $n'$ at its rear end. Somewhere near the center of its length, or rather nearer to its front end, the said lever has a flange or projecting shield $n^2$, lying in the path of a device connected with the cartridge-feeder, thereby enabling such device while the cartridge-feeder is raised as a result of the magazine being empty to turn the arresting-lever around its pivot $n^0$, and thereby bring it into its operative position. In the instance here given the device in question is a button or knob $p'$, secured to the cartridge-feeder $p$ and adapted to move on the outer wall of the magazine and to coöperate with the shield or flange $n^2$. The under side of the breech-block $c$ at its forward end has a slot or recess $c^0$, in which after the last cartridge has been fired the arresting-lever, which has been brought into the operative position, as stated, engages by means of its finger or projection $n'$. While in this position the said arresting-finger or projection engages the rear shoulder of the recess $c^0$, so that notwithstanding the action of the closing-spring the link mechanism cannot move into its extended position. When the empty magazine is removed, the breech still continues open, as the more powerful closing-spring $f$ presses the breech-block or its shoulder $c^0$ against the arresting-finger $n'$ and retains the same in position against the action of its spring $l$. The arresting-lever $n$ may, however, spring back to its inoperative position the moment it has in its turn been released by a slight retraction of the link mechanism effected by hand at the knee-point $c^x$ from contact with the shoulder $c^0$ of the breech-block, whereby at the same time a clear way will be left for the breech to spring back into its forward position under the action of the closing-spring. It is this arrangement that secures the advantages referred to in the introductory part of this specification.

Lastly, in connection with the "lock" and trigger devices the following improvements have been made: The breech-block $c$, sliding in the side grooves of the arms of the fork-shaped barrel extension and being engaged with by the front link $c'$ of the knee-jointed mechanism, receives in its interior the hollow firing-pin $e$, a nib $e'$ of which laterally protruding through a groove or slot provided in the wall of the block is so controlled by a nose $c'^x$, terminating the lever $c'$, that as the breech-block retires the firing-pin is "cocked." In the wall of the left-hand arm of the fork-shaped barrel extension the sear $k$ (shown more particularly at Figs. 7, 10, and 31) is arranged to oscillate upon its pivot $k^0$, the shoulder $k'$ of such sear intercepting the nib $e'$ as the breech-block advances and retaining the firing-pin thereby in its cocked position until the trigger is pressed—that is, until the sear has been so acted upon by the trigger-tongue that the shoulder $k'$ has retired and by so doing has released the firing-pin $e$. Now in accordance with this invention the arrangement has been so modified that the first movement or operation of the trigger may take place with comparative ease, but so that it becomes more difficult just before the release of the parts which serve to effect percussion—that is, the freeing of the nib $e'$—so that what may be described as a "pressure-point" is provided, whereby the marksman is enabled to manipulate the trigger in an absolutely reliable manner, or, in other words, precisely to determine the moment at which percussion should take place. To this end there is suspended in contact with the trigger-tongue $z$—that is, over it laterally—a special pressure-lever in the form of a double-armed or bell-crank lever $a'$ $a^2$, one arm of which—namely, the upper one, $a'$—extends upward and with its free end rests against the forward end of the sear $k$, which latter terminates in a spring-controlled pin or stud $k^5$. The lower arm $a^2$, which is nearly horizontal, engages in the recess $z^2$ of a piece $z'$, projecting from the tongue $z$, which, as usual, is retained in its initial or inoperative position by a spring $z^0$. In the position of rest of the trigger mechanism with the firing-pin cocked, but before firing, the extreme outer end of the lever-arm $a^2$ lies in contact with the upper wall of the recess $z^2$ in question, their point of contact at this stage being marked $a^3$ in the drawings. Figs. 6, 7, and 8 and also the diagram $8^b$ illustrate this position of the parts, and the last-mentioned figure in particular is an enlarged representation of the manner in which at this juncture the shoulder $k'$ acts as an abutment or support for the nib $e'$ and also of the relative positions of $a'$ to $k^6$ and of $a^3$ to $z^2$. Now the moment the pressure upon the trigger commences and its tongue $z$ is forced backward the wall of the recess will act upon the lever-arm $a^2$ or its extreme outer point of pressure $a^3$ and will thereby swing round the lever $a'$ $a^2$ upon its pivot $a^0$, when the effective lengths of the lever-arms $a'$ $a^2$ being approximately equal motion will be transmitted at the ratio of one to one. These conditions will prevail until eventually as the arm $a^2$ is drawn farther downward the wall of the recess meets an inner pressure-point $a^4$ of the arm $a^2$, at which moment the pressure-point position above referred to is reached. This intermediate situation of the parts is delineated in the enlarged diagram Fig. $8^c$, by referring to which it will be seen that by this time the wall of the recess has taken up its position upon both pressure-points $a^3$ and $a^4$ and that the sear $k$, overcoming the resistance of the spring $k^4$, acting upon the rear arm $k^3$ of the rod, has been pressed, with its point $k^6$, inward for a sufficient distance to cause the shoulder $k'$ to be withdrawn, so that it only slightly overlaps the outer angle of the nib $e'$. As after this the operation of the trigger is continued, the inner point of the pressure $a^4$ will alone be effective, so that for the slight movement which remains to be performed to complete the trigger operation, and which it will scarcely take a moment to accomplish, a far shorter length of lever $a^2$ will come into operation, the ratio of transmission being now one to two. Thus the last brief trigger movement immediately preceding percussion requires a comparatively greater expenditure of power than the initial longer movement, which may be accomplished with practically no appreciable effort. The position of the parts of the trigger mechanism immediately after percussion—that is, after the pressure-point has been overcome—is illustrated by the enlarged diagram $8^d$, by inspecting which it will be seen that the outer pressure-point $a^3$ is now relieved from contact with the wall of the recess $z^2$ in the projection $z'$ of the tongue $z$, contact with the inner pressure-point being alone maintained. By this time the shoulder $k'$ of the sear has just released the nib $e'$ of the firing-pin $e$, so that the nib $e'$ may now move past the sear $k$ and the firing-pin $e$ travel forward under the impulse of its spring $e^4$. The position of the parts after the firing-pin $e$ has thus sprung forward—that is, after firing—is illustrated in Figs. $8^a$, 9, 10, and 11, it being assumed, however, that the bullet has just left the barrel and that consequently the barrel is only just starting on its backward movement.

The arrangement adopted for securing the trigger against accidental movement and in conjunction therewith the locking or arresting of the barrel and other movable parts is best exemplified by Figs. 14 and 15. Here within the handle C at the rear part and mounted upon the pin $s^3$ there is provided an arm $s$, one end of which is formed with a beveled head or plate $s'$, shaped to engage with the sear, while a projection $s^0$ from the arm $s$ protrudes rearwardly from the handle C. By reason of the beveled head $s'$ taking up a position in the rearward path of the shoulder $k^2$ of the sear $k$, and thereby preventing the movement of the latter, such sear becomes locked, so that neither by the operation of the trigger-tongue $z$ nor through any accident can the firing-pin become released for firing. At the same time that the sear $k$ is thus secured in position the barrel and all its accessory parts are arrested, the head $s'$ remaining in the path of the devices movable concurrently with the barrel. The head $s'$ does not relinquish this locked position until after the butt C has been firmly grasped, and consequently the projection $s^0$ pressed forwardly against the resistance of its spring; but the moment this has been done all the movable parts recover their freedom of operation. The trigger and other movable parts are in this manner locked as long as the projection $s^0$ is not pressed toward the butt; but in order that it may even be held in the hand with safety, no matter how carried, the automatic locking devices have further been supplemented here by arrangements which enable the marksman himself by a grip of his hand so to secure the said devices that he cannot, except consciously, release them. This purpose is effected by the double-armed lever $d$, pivoted on the handle-piece or butt by the pivot $d^3$, the inner arm $d'$ of which lever is provided with a laterally-projecting stud $d^2$, which, according to its position for the time being, comes into engagement with a lateral projection $s^2$ from the retaining-arm $s$ and so secures such arm that no matter how firmly the projection $s^0$ is depressed the arresting effect is maintained and all the parts continue secure, as shown at Fig. 14, until by turning the outer lever downward the extension $d^2$ rises, disengaging the projection $s^2$, and thereby restoring the freedom of motion of the arm $s$, as shown at Fig. 15. To enable the locking-lever $d$ to be secured in either of the two positions assigned to it, its upper arm is made as or controllable by a spring and fitted with an inwardly-projecting stud, which engages in the notches 1 and 2, provided in the sides of the handle-piece or butt.

The trigger cover-plate $q$ (shown in detail in Figs. 23, 24, and 25) is provided with extensions $q^2$ and $q'$, the latter being for the handle $r^2$ of the locking-bolt $r$ to work against.

The cartridge-ejector $w$ (shown in detail in Fig. 32) is arranged on one side of the barrel extension B, as shown in Fig. 7, and is provided with projections $w'$, $w^2$, and $w^0$, operating in the usual approved manner.

The cartridge-extractor $v$ (shown in detail in Fig. 33) is secured to the front upper part of the breech-block $c$, as shown in Fig. 9, and is provided with a projection $v'$ for engaging with the flange of the cartridge.

The end piece $e^2$ of the breech-block (shown in detail in Fig. 35) is secured to the breech-block, as shown in Fig. 6, and is provided with a catch $e^{2\times}$ for locking it in position and a pin $e^3$ for guiding the springs $e^4$, which operate the firing-pin.

The projection $c^\times$ at the joint of the toggle-levers is provided with a hooked catch member $t^2$, (see Fig. 4, $4^a$, and 8,) which engages with the projection $t'$ of a catch member $t$ on the receiver C when the breech is closed. The catch member $t^2$ (shown in detail in Fig. $4^a$) is preferably a spring-actuated catch member, being pivoted to the projection $c^\times$ by a pin $t^4$ and provided with a spring $t^5$. These catch members hold the toggle-levers in their closed position and prevent them from rising until the hooked end of the catch member $t^2$ has been slid rearwardly from under the projection $t'$.

A catch $u$ of approved construction is provided for holding the magazine in place.

What I claim is—

1. In a recoil-operated firearm, the combination, with a rearward-moving barrel and its extension, of a non-recoiling receiver or casing having a depending hollow handle-piece which is open to the said receiver, a breech-block, linked levers pivoted to the said breech-block and extension and having a laterally-extended projection at a point intermediate of their end pivots, and a spring secured in the said handle-piece under the said linked levers and operatively connected with one of them, said non-recoiling casing having at its side a guide-surface with which the said projection engages during the recoil.

2. The combination, with a non-recoiling receiver or casing having a depending hollow handle-piece which is open to the said receiver, of a rearward-moving barrel and its extension slidable in the said receiver, a breech-block, linked levers pivoted to the said breech-block and extension and having a laterally-extended rounded stud or projection arranged at their bending or knee point circumjacent to the pivot-pin connecting such levers, and a spring secured in the said handle-piece under the said linked levers and operatively connected with one of them, said non-recoiling casing having at its side a guide-surface with which the said stud or projection engages during the recoil of the barrel.

3. In a recoil-operated firearm, the combination, with a non-recoiling receiver, and a barrel and a barrel extension slidable therein; of a breech-block, toggle-levers connecting the said extension and breech-block, a catch member on the said receiver, and a catch member carried by the said toggle-levers, said catch members operating to lock the toggle-levers until one catch member has been slid rearwardly out of engagement with the other during the first part of the recoil.

4. In a recoil-operated firearm, the combination, with a non-recoiling receiver having a guide-surface on one side, and a barrel and a barrel extension slidable in the said receiver; of a breech-block, toggle-levers connecting the said extension and breech-block and having a lateral projection at their knee-point which engages with the said guide-surface during the recoil, a catch member on the said receiver, and a catch member carried by the said projection, said catch members operating to lock the toggle-levers during the first part of the recoil and to release them automatically before the said projection strikes the said guide-surface.

5. In a recoil-operated firearm, the combination, with a non-recoiling receiver, and a barrel and a barrel extension slidable therein; of a breech-block, toggle-levers connecting the said extension and breech-block, a catch member on the said receiver, and a spring-actuated catch member carried by the said toggle-levers, said spring-actuated catch member being adapted to engage automatically with the aforesaid catch member when pressed downward on it at the closing of the breech and operating to lock the said toggle-levers until it has been slid rearwardly out of engagement with it.

6. In a firearm, the combination, with a receiver, a removable trigger cover-plate arranged at one side of the said receiver, and a barrel slidable in the said receiver and provided with a projecting shoulder; of a bolt journaled in the front end portion of the said receiver and provided with a projection at its middle part which engages with the said shoulder on the barrel and also with the side wall of the said receiver, the barrel being thereby normally prevented from sliding forwardly and the bolt prevented from sliding longitudinally, and an operating-handle at one end of the said bolt which normally engages with the said cover-plate and prevents it from being removed from the receiver.

7. In a firearm, the combination, with a receiver provided with a handle, and a barrel and firing mechanism slidable in the receiver; of a catch pivoted at one end in the lower part of the handle and having a head at its free end which prevents the firing mechanism from being moved rearwardly, said catch having also a projection at its middle part, and a pin pivoted in the said receiver above and behind the said catch and having an inner arm provided with a stud which engages with the said projection and locks the said catch, said pin having also an outer arm or operating-lever.

8. In a recoil-operated firearm, the combination, with a non-recoiling receiver, a barrel extension slidable therein, and a magazine provided with a spring-pressed cartridge-feeder; of a breech-block slidable in the said extension, and a catch for engaging the said breech-block when the magazine is empty, said catch being pivoted to the said receiver on one side of the discharge-opening of the magazine and being moved into engagement with the said breech-block by the said cartridge-feeder.

9. In a recoil-operated firearm, the combination, with a non-recoiling receiver, a barrel extension slidable therein, a magazine under the said extension, and a cartridge-feeder slidable in the magazine; of a breech-block slidable in the said extension, a catch pivoted to the said receiver and arranged to one side of the discharge-opening of the magazine and provided with a lateral projection for engaging with the breech-block, and a tappet on the said cartridge-feeder which moves the said catch into engagement with the breech-block when the magazine is empty.

10. In a recoil-operated firearm, the combination, with a non-recoiling receiver, a barrel extension slidable therein, a magazine under the said extension, and a spring-pressed cartridge-feeder slidable in the magazine; of a breech-block slidable in the said extension, a catch pivoted to the said receiver and arranged to one side of the discharge-opening of the magazine, a releasing-spring which normally holds the said catch out of engagement with the breech-block, a tappet on the said cartridge-feeder which moves the said catch into engagement with the breech-block when the magazine is empty, and a second spring which presses the breech-block endwise against the said catch and normally prevents the said releasing-spring from releasing it when the cartridge-feeder is retracted.

11. The combination, with a pivoted trigger-tongue and sear, of a bell-crank lever for operating the sear pivoted transversely of the trigger-tongue, one of the said parts being provided with projections arranged at different distances from the pivot of the said lever which bear against the other said part one after the other, whereby the leverage of the bell-crank lever is changed during the movement of the said trigger-tongue.

12. The combination, with a pivoted trigger-tongue and sear, of a bell-crank lever for operating the sear pivoted transversely of the trigger-tongue, one arm of the said bell-crank lever being provided with projections at different points of its length with which the said trigger-tongue engages one after the other, substantially as set forth.

13. The combination, with a pivoted trigger-tongue, and sear, of a bell-crank lever for operating the sear pivoted transversely of the trigger-tongue, and means for increasing the leverage of the bell-crank lever during the movement of said trigger-tongue, the maximum of leverage being coextensive with the completion of the trigger operation, as set forth.

In testimony whereof I affix my signature in presence of two witnesses.

GEORG LUGER.

Witnesses:
HENRY HASPER,
WOLDEMAR HAUPT.